(No Model.)

W. H. FISHER.
CARTRIDGE SHELL HOLDER.

No. 339,396. Patented Apr. 6, 1886.

Attest: Jno. W. Strehli
O. M. Hill

Inventor
Wm. Hubbell Fisher

N. PETERS, Photo-Lithographer, Washington, D. C.

UNITED STATES PATENT OFFICE.

WILLIAM HUBBELL FISHER, OF CINCINNATI, OHIO.

CARTRIDGE-SHELL HOLDER.

SPECIFICATION forming part of Letters Patent No. 339,396, dated April 6, 1886.

Application filed March 27, 1885. Serial No. 160,151. (No model.)

*To all whom it may concern:*

Be it known that I, WILLIAM HUBBELL FISHER, a citizen of the United States and a resident of Cincinnati, in the county of Hamilton and State of Ohio, have invented certain new and useful Improvements in Cartridge Shell Holders, of which the following is a specification.

The several features of my invention, and the various advantages resulting from their use, conjointly or otherwise, will be hereinafter set forth and claimed.

Figure 1:
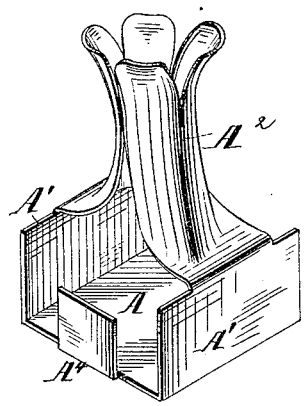
Figure 2:
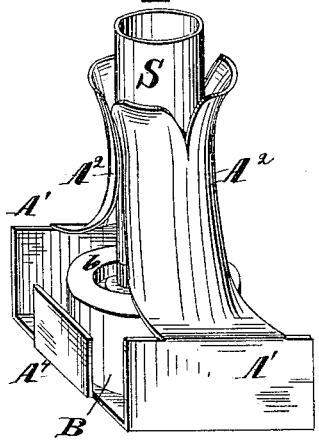
Figure 3:
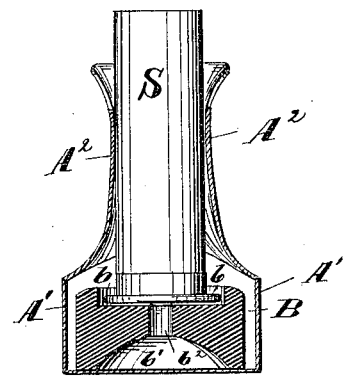
Figure 4:
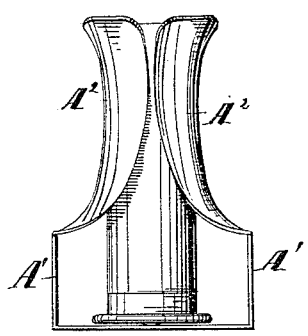
Figure 5:
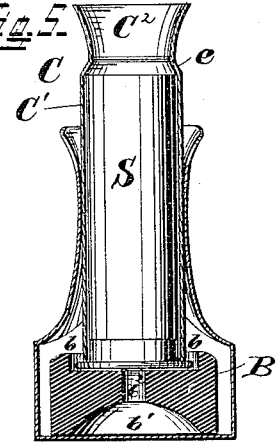
Figure 6:
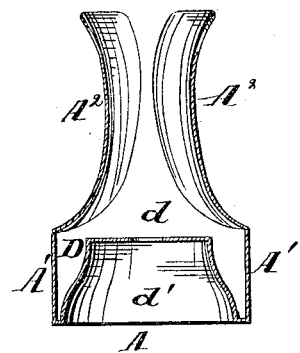
Figure 7:
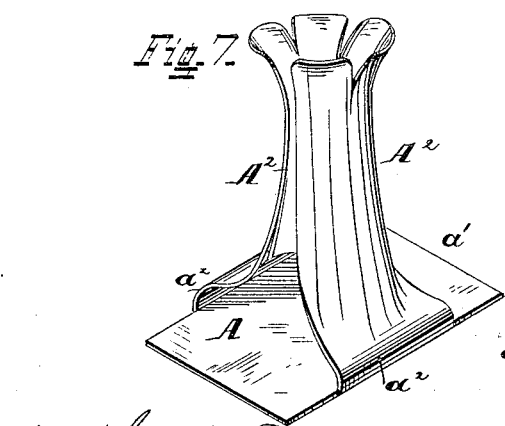
Figure 8:
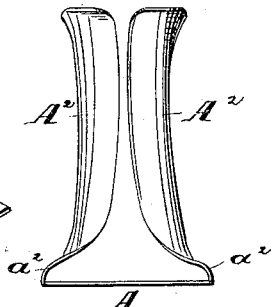

In the accompanying drawings, Figure 1 is a perspective view of my device. Fig. 2 shows the device holding a decapping-block and shell in position. Fig. 3 is a vertical central cross-section of the device shown in Fig. 2, taken at the line $x$ of Fig. 2, the shell being shown in elevation and in position in said device. Fig. 4 is a front view of my device, illustrating its use without the decapping-block. Fig. 5 is the same as Fig. 3, except as to the wad-starter, which latter is shown in position and in vertical central section. Fig. 6 is a cross section of a modification of my device, in which an elevation on the bottom of the device is substituted for the decapping-block. Fig. 7 is a perspective view of another modification of my device intended for use without a decapping block or substitute for it. Fig. 8 is an end elevation of the device illustrated in Fig. 7.

The device is preferably made of sheet-brass or tin, and it is desirable that it be made of some substance possessing elasticity.

The base-plate A is preferably square in shape and large enough to furnish a steady support. It has two side pieces, A′, rising from it at about right angles. Two flaring wings, A², are connected to the pieces A′ and are curved over toward the center of the device, from which point they extend upwardly and are curved laterally, so as together to form a cylindrical tube to receive and hold the cartridge-shell.

One of the many descriptions of shells, all of which may be applied to and held by my holder, is shown and indicated by the letter S. At the rear of the base A a little upright stop, A⁴, is preferably present when an independent adjustable decapping base-block is to be used in connection with the wings. The whole device is easily and is preferably cut out of one piece of metal and stamped into shape.

A seating or decapping block may be used in connection with this device, such block being formed to enter the recess between the side pieces, A′ A′. The cylindrical seating and decapping block now in common use and having upper circular depression, $b$, to receive the head of the cartridge-shell, and under cavity, $b′$, communicating with depression $b$ by means of channel $b^2$, is preferred. Cavity $b′$ is to receive the exploded cap as it is driven down and out of the shell in the operation of decapping.

The wad-starting device C may be readily used in connection with the holder. As this wad-starter is well known, a brief description only will here now be given. The wad-starter consists of tube C′, whose diameter is just large enough to permit it to easily slip over the cartridge-shell, and whose length is such that, when its lower end is resting on the expanded rim of the cartridge-head, the contracted neck $e$ is brought just above the top of the cartridge-shell, as shown in Fig. 5. A flaring funnel-shaped top, C², completes the wadding device.

When in use, the block B is slipped into position between the sides A′, whose distance apart is such as to just allow the entrance of the block. Posteriorly the stop A⁴ prevents its being thrown through and secures its being centered under the tube formed by the flaring wings A² above. The shell is now introduced from above, pushing aside the flaring wings A² as it descends, and is grasped and held by them on account of their elasticity. When thrown clear home, the head of the shell rests in the depression $b$ of block B, as shown in several of the figures. The device is now ready for loading, and presents a cartridge-shell with a firm base, which may be easily detached when desired. After putting in the charge of powder, or before, if desired, the wadding device C is put in position, slipping over the shell and gently separating the wings A² as it descends. The wad as it passes the neck $c$ is momentarily compressed and enters the shell without difficulty.

It then immediately expands and fills the shell properly. The block B, besides holding the end of the shell, has another function, as indicated by its name, the "decapping-block." When a shell with a spent cap is placed in the holder to be reloaded, the cap is first detached by pushing it with a small rod through the opening $b^2$ into the cavity $b'$. Here the decapped shells collect until it becomes necessary to clear the cavity.

Instead of using the separable block B, a base, D, may be soldered onto the base-plate A or stamped up from it. This base D, Fig. 6, has an opening, $d$, to allow the caps during the operation of decapping shells to be forced into its cavity $d'$. When it is soldered to the base-plate A, the latter has opening $d$, through which the caps in the cavity $d'$ may be removed.

When it is desired to dispense with the block B or a substitute, the modification shown in Figs. 7 and 8 will be seen to combine the remaining requirements. In this form the arms $A^2$ spring immediately from the base-plate A. This latter, to give the necessary solidity to the device, is extended front and rear, forming the projections $a'$. It is also preferably made much wider than the cartridge-shell itself, and in consequence where one piece of sheet metal is employed, as is preferably the case, the metal to be used in forming the wings $A^2$ is doubled onto the plate A for some distance before being turned upwardly to form the wings $A^2$. It thus forms the feet $a^2$. The base A is preferably perforate at Z, where the cap of the cartridge-shell rests.

Among the many advantages resulting from the use of my invention, the following are especially to be noted: The holder holds the shell firmly and with stability, so that to upset it is next to an impossibility; the cartridge-shell is readily and quickly inserted in the holder and readily and quickly withdrawn therefrom; the wad-starter is easily and quickly inserted into the holder either when the cartridge-shell has been previously inserted into the holder or along with the shell, and the starter is readily withdrawn from the holder.

In its preferred form the holder affords an opportunity for decapping as well as loading the shell.

As before intimated, the holder may be elastic or non-elastic; but it, or at least the upper portions, should be elastic, in order to secure the best results from its use, as, when elastic, it will hold the cartridge-shell especially firm and steady.

My device may be applied to other uses than holding cartridge-shells, among which may be mentioned its use as a bouquet-holder and as a candlestick.

While the various features of my invention are preferably used together, one or more of them may be employed without the remainder, and in so far as applicable one or more of said features may be employed in connection with devices other than those herein particularly specified.

What I claim as new and of my invention, and desire to secure by Letters Patent, is—

1. A cartridge-shell holder consisting of a flat base of sheet metal and two spring-arms extending upward from the base, then approaching each other, then extending upward and flared outward at the top, substantially as described.

2. A cartridge-shell holder formed of a single piece of sheet metal having a flat base and spring-arms extending up from opposite sides thereof, said arms approaching each other a little above the base and being flared outwardly at the top, substantially as described.

3. The combination, with a base, of upwardly-extending arms at opposite sides thereof, and a perforated cartridge-decapping seat inclosed between said arms, substantially as described.

4. The combination, with a flat metallic base-piece, of two spring-arms extending upward from opposite sides thereof, said arms integral with said base, and a projection, as $A^4$, extending upward from another side of the base to a less height than the spring-arms, as set forth.

WILLIAM HUBBELL FISHER.

Attest:
 JNO. W. STREHLI,
 O. M. HILL.